March 24, 1964 R. A. WHITE 3,125,809
VALVE CONTROL FOR DENTAL HANDPIECE
Filed Nov. 7, 1960 2 Sheets-Sheet 1
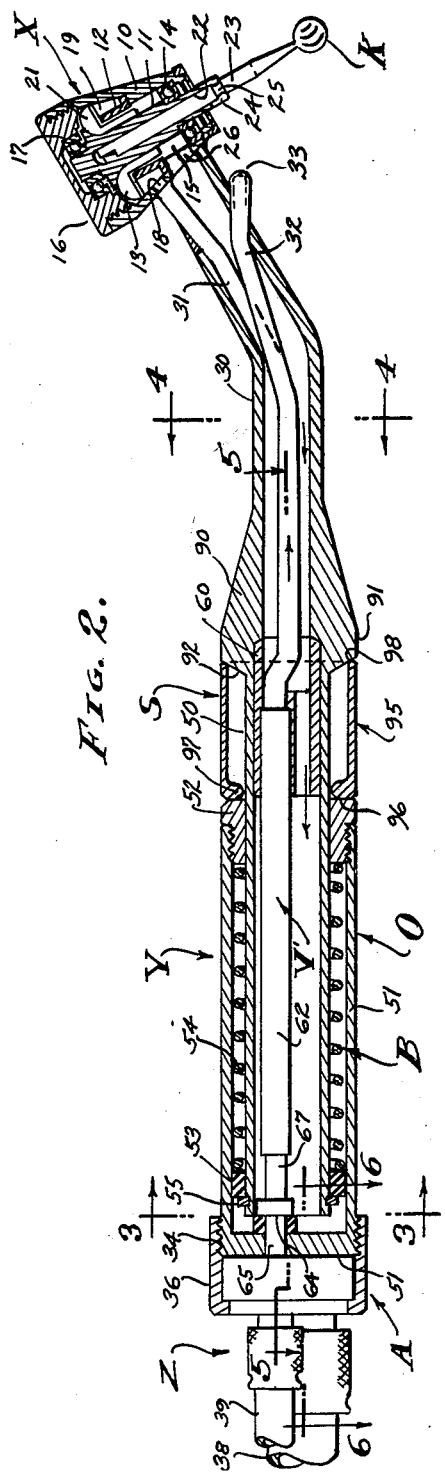
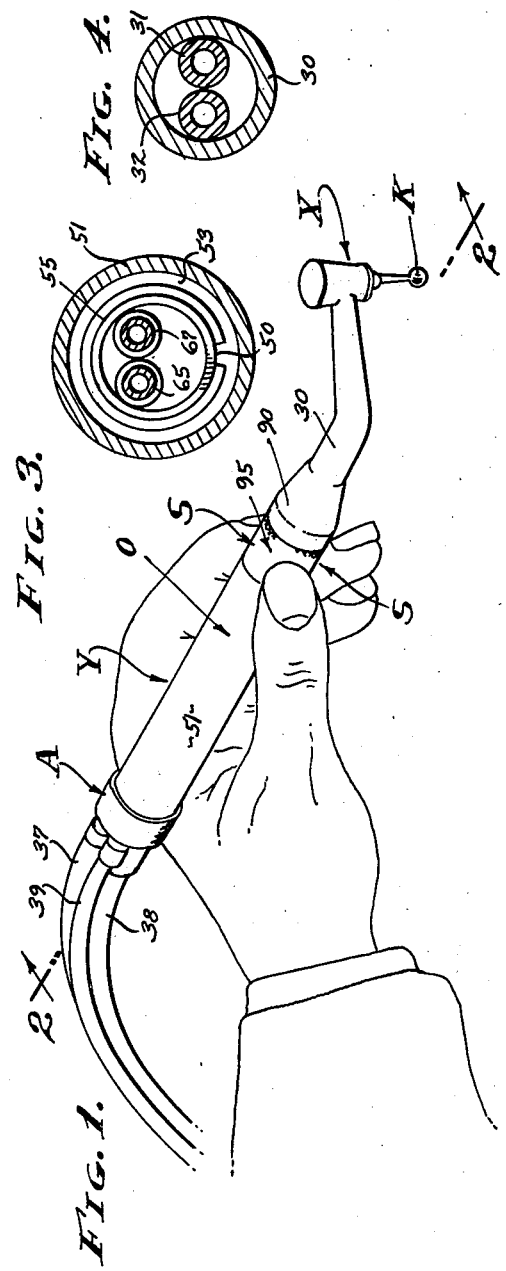
INVENTOR.
RAYMOND A. WHITE
BY
W. H. Maxwell
AGENT

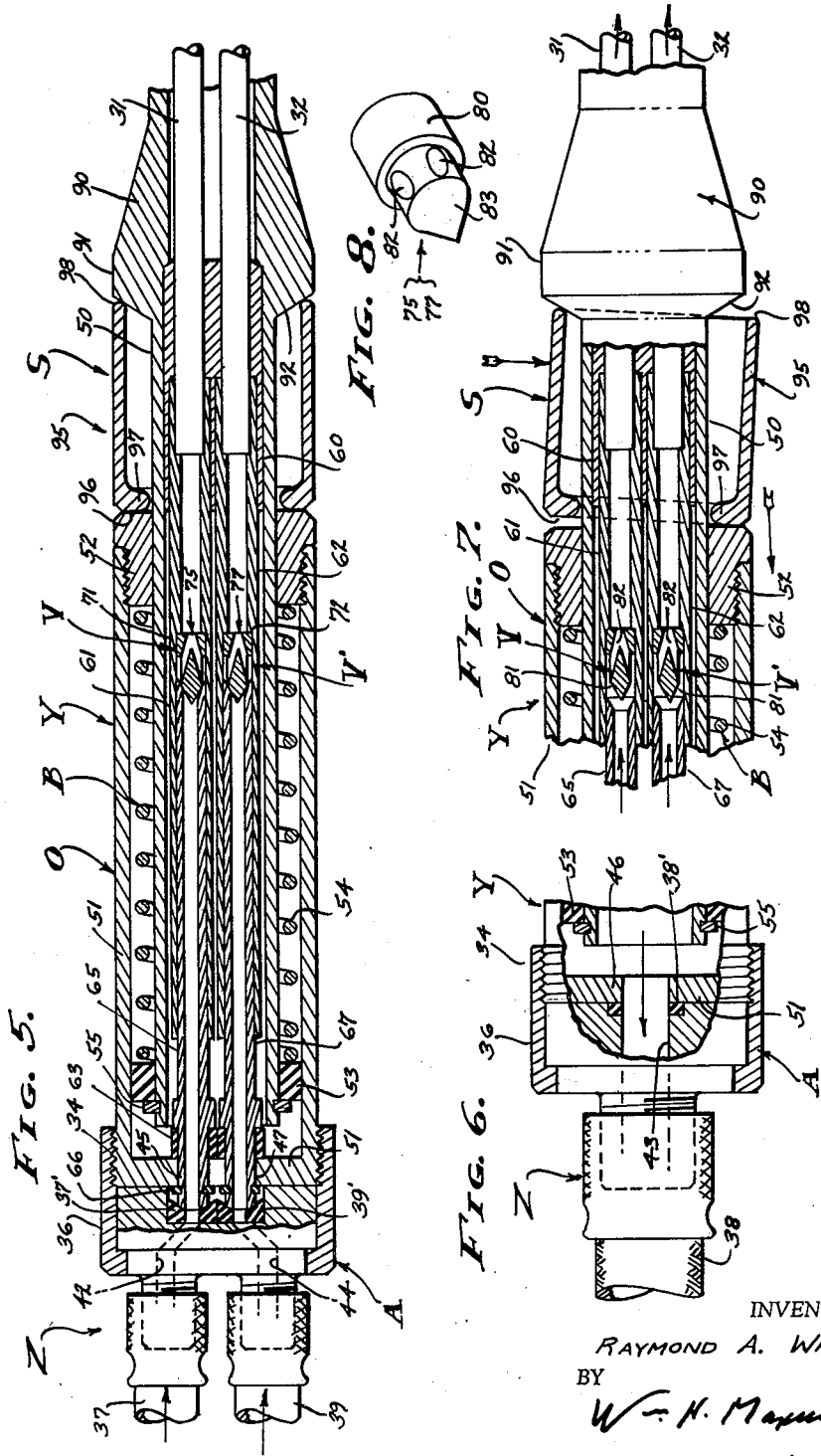
March 24, 1964    R. A. WHITE    3,125,809
VALVE CONTROL FOR DENTAL HANDPIECE
Filed Nov. 7, 1960    2 Sheets-Sheet 2
INVENTOR.
RAYMOND A. WHITE
BY
AGENT United States Patent Office 3,125,809
Patented Mar. 24, 1964

3,125,809
VALVE CONTROL FOR DENTAL HANDPIECE
Raymond A. White, San Pedro, Calif., assignor to The Dentists' Supply Company of New York, York, Pa., a corporation of New York
Filed Nov. 7, 1960, Ser. No. 67,758
10 Claims. (Cl. 32—27)

This invention relates to a valve control for a dental handpiece and has to do with a handpiece control that lends itself to facility of manipulation in order to throttle and/or control the speed of operation of the drive motor of the handpiece, it being a general object of this invention to provide a compact and reliable valve control in a self-contained dental handpiece and which is adapted to accurately throttle the speed and general operation of the drive motor thereof.

Dental handpieces are made with the drive motor incorporated therein and with power or energy conducted to the handpiece and utilized in the said handpiece to drive the rotating elements thereof. The particular handpiece under consideration is driven by fluids under pressure, either gas or a liquid, and it involves a manually operable control therefor. The handpiece is held in the hand of the dentist and it is controlled completely by said dentist's hand, to start and stop the motor as well as the throttling thereof or the speed of rotation thereof, and to control other fluids, as for example, coolants in the form of water or air and water mist.

It is an object of this invention to provide an improved valve control for a handpiece used in dentistry and for operation by the single hande of of the dentist that is employed to manipulate the handpiece, and whereby the controlling valve is directly positioned and operated by a shiftable element positioned by the dentist's hand.

It is another object of this invention to provide a handpiece as above set forth wherein the throttling valve, and/or other controlling valves, are housed within the body construction to control flow of operating fluids.

It is also an object of this invention to provide a handpiece as above set forth wherein the manually operable control element is depressible universally from any position surrounding the body of the handpiece and to cooperatively engage with cam means adapted to actuate a valve in response to depression of said element.

Further, it is an object of this invention to provide a compact self-contained dental handpiece that includes a manual control and also individual valving means for the several operating fluids used in dentistry processes, all incorporated on and within the body structure in a most practical and advantageous manner.

The various objects and features of my invention will be fully understood from the following detailed description of a typical preferred form and application of my invention, throughout which description reference is made to the accompanying drawings, in which:

FIG. 1 is a perspective view of the handpiece showing the manner in which it is manipulated. FIG. 2 is an enlarged longitudinal sectional view taken as indicated by line 2—2 on FIG. 1. FIGS. 3 and 4 are enlarged transverse sections taken as indicated by lines 3—3 and 4—4 on FIG. 2. FIG. 5 is an enlarged detailed plan section taken as indicated by line 5—5 on FIG. 2. FIG. 6 is an enlarged fragmentary view taken as indicated by line 6—6 on FIG. 2. FIG. 7 is an enlarged fragmentary view showing movement of parts; and FIG. 8 is a perspective view of the valve seat that I provide.

The drive for the handpiece is incorporated in the head X thereof in the usual manner. In the particular construction illustrated the handpiece is of the "contra-angle" type wherein the axis of the head X is at an angle to the axis of the handpiece body Y. Further, the power or energy for driving the rotating elements is conducted to the body Y and head X through a fluid supply means Z. In addition to the above mentioned head X, body Y and fluid supply means Z, the handpiece is characterized by a manually operable control S adapted to be manipulated by the fingers of the hand used to hold and support the handpiece.

The driving head X, as best illustrated in FIG. 2 of the drawings, is a drive unit or prime mover and involves, generally, a case 10, a shaft 11 rotatably carried in the case to project from one end thereof, a stator 12 fixed in the case to receive and direct fluid handled by the driving head X, and a rotor 13 preferably integral with the shaft 11 to receive fluid directed by the stator and adapted to rotate the shaft.

The case 10 isa n elongate shell-like part with a cone-shaped outer wall tapered inwardly toward the lower end thereof. A seat is provided at the lower end of the case 10 to carry an anti-friction bearing 14, and a shoulder is provided intermediate the ends of the case 10 to support the stator 12 in the case. Intermediate the bearing 14 and stator 12 there is an exhausting chamber 15 defined by the wall of the case 10 and surrounding the shaft 11. A cover 16 closes the top of the case 10 and has a seat to carry an anti-friction bearing 17. The bearings 14 and 17 rotatably support the shaft 11 within the case 10, the lower end of the shaft 11 projecting somewhat from the bottom of the case.

The stator 12 receives fluid under pressure, preferably air or the like, through a port 18 in the wall of the case 10. The stator 12 is characterized by an annular chamber 19 defined by the wall of the case 10 and an inner wall of the stator 12. Fluid received by the stator 12 is directed upwardly through vanes that are carried thereby, said vanes being in a continuous annular series.

The rotor 13 receives fluid directed upwardly by the stator 12 and is adapted to handle the fluid so that it is conducted inwardly and downwardly imparting driving force to the rotor 13. The rotor 13 is preferably integral with the shaft 11 and has a continuous annular series of blades 21. The stator vanes and blades 21 are suitably pitched, in the direction of rotation, and as circumstances require, in order to gain the desired speed of rotation, etc.

The head X is employed to drive a cutter K, for example, a burr cutter, as shown. The shaft 11 has a straight bore 22 entering the lower end thereof to slidably receive the shank 23 of the cutter. The upper end of the cutter shank 23 is notched to engage with a key in the bore 22. In order to retain the cutter K in working position, I may provide a friction exerting or detent-type collet at the lower end portion of the shaft 11. For example, the lower end portion of the shaft 11 is split at 24 and provided with inward projections that engage in a groove 25 in the shank 23.

In operation, fluid used to drive the rotor is received from the lower end of the rotor by the exhausting chamber 15, and it is directed from the chamber through an enlarged exhaust port 26 in the side wall of the case 10, see FIG. 2).

The body Y, in accordance with the preferred form of the invention, is a multi-tubular element adapted to conduct fluids to and from the head X. That is, the body Y involves a plurality of fluid conducting passages fabricated from a plurality of tubular elements. As shown, the body Y is a combination of tubes that form and house the valves that control fluid flow.

The body Y involves an outer tubular case 30 and one or more inner tubes housed within the case 30. In the particular case illustrated there is an inner tube 31 adapted to conduct fluid under pressure to the inlet port 18 in the head X, and an inner tube 32 adapted to conduct fluid coolant to the vicinity of the head X. The outer tubular case 30 is of substantial cross-sectional configuration and is substantially coextensive with the length of the handpiece, and it is adapted to receive exhaust fluid from the port 26 in the head X. As shown, the case 30 is large and round with a flow passage extending coextensively therethrough and opening at both the front and rear ends thereof.

In accordance with the invention, the outer case 30 is flattened at the forward end portion thereof, in a horizontal plane, to be coextensive with the height and width of the exhaust port 26. The port 26 is coextensive with the inner diameter of the case 10 and the side walls of the tubular case 30 are tangent to the walls of the case 10. The forward end of the case 30 is suitably shaped and the head X secured thereto as by brazing, or the like. It will be observed that the forward portion of the case 30 may be gradually flattened, and that it may be upturned, as shown, to form a "contra-angle" handpiece.

The inlet port 18 is located in the head X immediately above the exhaust port 26, and is substantially smaller than the port 25. The inner tube 31 is considerably smaller than the outer case 30 and extends longitudinally of the interior of the case. The inner tube 31 is provided to conduct fluid under pressure for operation of the driving head X and extends longitudinally of the interior of the case. The inner tube 32 is provided to conduct a coolant, or the like, to the vicinity of the head X and extends to a suitable tip that has a jet 33 to direct fluid coolant in the area of the cutter K.

The fluid supply means Z, as clearly shown in the drawings, is provided to handle the passage of fluids to and from the head X of the handpiece. That is, the means Z handles the flow of compressed air to the inner tube 31 and it handles exhaust air from the interior of the outer tubular case 30, and it handles coolant to the inner tube 32. The means Z involves, generally, an adapter A coupled with fluid connections including a fluid pressure supply line 37, an exhaust line 38, and a coolant supply line 39. The adapter A is coupled to the rear end of the handpiece by means of a nut 36 threaded at 34, and it has passages 42, 43 and 44 that communicate with the lines 37, 38 and 39, respectively and compressible seals 37', 38' and 39' which communicate with corresponding connectors 45, 46 and 47 that project from the rear end of the handpiece.

In accordance with the invention, the body Y has the controlling valves incorporated therein, there being a throttling valve V and a coolant supply valve V', to be operated simultaneously. The body Y is cylindrical in shape, having a round outer wall 50, and in accordance with the invention an operator sleeve O is carried on the rear end portion of the body Y. The operator sleeve O is actuated by the control S later described and movably supports the shiftable valve elements of the throttling valve V and coolant supply valve V'. The sleeve O is closed at its rearmost end by a wall 51 that overlies the open rear end of the tubular case 30, while the sleeve per se is spaced circumferentially from the wall 50 in order to accommodate biasing means B. In order to assemble the sleeve O in working position over the body Y and so that it is retained in place, a bearing nut 52 is threadedly engaged with the sleeve at its forward end to side on the body wall 50, and a bearing seal 53 is carried at the rear end of the body Y to slide within the sleeve O.

The biasing means B is preferably a spring means involving a helical compression spring 54 engaged between the bearings 52 and 53. A snap ring retainer 55, or the like, secures the seal bearing 53 in working position, after which the sleeve O is threadedly engaged with the bearing nut 52. It will be apparent how the operator sleeve O is yieldingly urged forwardly.

In accordance with the present invention, the inner tubes 31 and 32 extend rearwardly from the forward portion of the surrounding tubular case 30 that houses them. As shown, a guide 60 positions the tubes 31 and 32 for aligning them parallel with each other and with the axis of the case 30. As clearly illustrated, the inner tube 31 has a rearwardly extending valve element 61, while the inner tube 32 has a rearwardly extending valve element 62. The elements 61 and 62 comprise parts of the valve means V and V', respectively, and in the case illustrated they are the seat elements of said means.

In accordance with the present invention, the wall 51 of the sleeve O carries the rearwardly projecting connections 45, 46 and 47 and it also carries forwardly projecting valve elements 65 and 67 positioned thereby to align with the valve elements 61 and 62, respectively. In practice, the connection 45 and valve element 65 are formed as a single integral part, while the connection 47 and valve element 67 are also formed as a single integral part. In this case, each is a tubular part that extends through the wall 51, there being a flange forming a shoulder 64 (see FIG. 2) to engage the forward face of said wall and there being a snap ring retainer 66 (see FIG. 5) or the like, to engage the rear face of said wall. A resilient washer 63 (see FIG. 5) is placed between the wall 51 and the flange of the valve element 65 or 67, and said washers 63 yieldingly positions the valve elements to engage them with the seat elements 61 and 62. The exhaust fluid discharges into the fitting 46 (a passage through wall 51) and through the passage 43 to the line 38.

As best illustrated in FIG. 5 of the drawings, the valve means V and V' involve the cooperative engagement of the valve elements 61 and 62 with the valve elements 65 and 67, respectively. As shown, the element 61 is telescopically engaged over the element 65, while the element 62 is telescopically engaged over the element 67. The said elements have substantial lapped engagement with a close sliding fit, and so that additional sealing means is not required at the operating pressures ordinarily involved. The element 61 is shouldered at 71 to position a seat 75, while the element 62 is shouldered at 72 to position a seat 77 (see FIG. 5). The operator sleeve O yieldingly presses the valve elements 65 and 67 forwardly into pressured engagement with said seats.

The seats 75 and 77 are alike and each involves a body 80 positioned by the shoulders 71 or 72 (see FIGS. 5 and 8). The forward end portion of the seat is slightly reduced in diameter leaving an annular passage 81 (see FIG. 7) within the inner bore of the tubular elements 61 or 62, and longitudinal ports or passages 82 extend from the said annular passage 81 to the center of the seat to open into the elements 61 or 62 at the forward end of said seat (see FIG. 7). It is preferred to gain a throttling action, in which case the rearwardly disposed seat face 83 is tapered or cone-shaped, and the tube elements 65 or 67 have forwardly disposed correspondingly bevelled ends (as shown). It will be apparent that withdrawal of the valve ends from the seat faces 83 gradually opens the fluid passages to the valve elements 61 and 62, respectively.

The present invention involves the control S that I provide for actuating the valves V and V' in order to admit fluids to the head X of the handpiece. In accordance with the invention the control S is adapted to be operated by any one or more of the fingers of the hand supporting the structure and involves, generally, a cam and a manually depressible element or lever. The wall 50 of the case 30 forms a stop means for engaging the said depressible element or lever and limiting movement thereof.

The cam can vary widely in configuration and can be a curved cam or a simple flat cam. The said cam can be disposed in various ways, for example it can be disposed normal to the axis of the handpiece or it can be inclined. However, in accordance with the preferred form of the invention it is a circular inclined element that extends continuously around the body Y of the handpiece. As illustrated in FIG. 2 of the drawings, the cam is in the form of a ring 90 engaged over and projecting from the outer wall 50 of the body Y, and it may be secured in place as by brazing or the like. As shown, the outer wall 91 of the ring 90 is cylindrical and fairs into the body Y as it extends forwardly. The ring has an active rearwardly disposed face 92 adapted to have bearing engagement with the manually depressible element or lever, as hereinafter described, said face 92 being rearwardly and inwardly convergent to form part of a cone.

The manually depressible element or lever may be on a simple pivot, however, in accordance with the invention it is a circular element that surrounds the body Y to be manually engageable at any point or position around the body. As illustrated in FIGS. 2 and 3, the lever is in the form of a collar 95 that encircles the body Y, closely at its fulcrum end and with some clearance at its other end. The collar 95 is preferably cylindrical and is larger in diameter than the body Y and engages over the body and rearward of the ring 90 that forms the cam. A flange 97 extends inwardly at the rear end portion of the collar 95 and the collar is provided with a flat rearwardly disposed operating face 96. The flange 97 has a curved inner diameter that has bearing engagement with the wall 50, said inner diameter being sufficiently larger than the diameter of wall 50 to permit depression and rocking of the lever. Both the said cam and the said lever are continuous annular parts that are adapted to have bearing contact with each other at any point around the structure. Further, the foremost end of the collar 95 is a rounded lip 98 in order to have point contact where it slides on the cone-shaped cam surface.

By depressing the forward end portion of the collar 95 inwardly, at any point around the circumference thereof, the flange 97 is rocked, from its normally transverse plane normal to the axis of the handpiece, and the lip 98 slides inwardly along the cam face 92 to shift the lever rearwardly and so that the peripheral part of the flange 97 diametrically opposite the pivot point is moved axially rearward. It will be apparent that depression of the collar 95 at any point will rock the flange 97 and will cause rearward movement thereof. The operating face 96 is normally in flat engagement with the forward end of the bearing nut 52, and when the lever is depressed, as above set forth, the nut 52 is directly engaged and shifted rearwardly.

From the foregoing it will be apparent that I have provided an improved and very practical dental handpiece in which the valve control is controlled entirely by the single hand of the user. It is merely necessary to couple the handpiece adapter A to suitable fluid supply lines, preferably flexible supply lines, whereupon the device is ready for operation. The operation of the structure involved is clearly set forth above, by simply operating the single valve actuating element that is operated by the fingers of the person manipulating the handpiece.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fluid-operated handpiece including, an elongated body, an annular inclined cam fixed to and encircling the body, a fluid-operated head at the forward end of the body, an operator sleeve reciprocally carried on and surrounding the exterior of the body, a manually depressible element on the body to actuate the operator reciprocally and in the form of a collar surrounding the body and one end of said collar having slidable engagement with said annular inclined cam, and a fluid-controlling valve element positioned relative to said body by the operator and controlling operation of the head.

2. A fluid-operated handpiece including, an elongated cylindrical body, an annular inclined cam fixed to and encircling the body, a fluid-operated head at the forward end of the body, an operator sleeve reciprocally carried on and surrounding the exterior of the body and with a bearing having an annular end in a plane normal to the body, a normally depressible lever pivoted against the end of said sleeve bearing to actuate the operator reciprocally and in the form of a collar substantially larger in diameter than the body and with an annular free edge at one end surrounding the body and having slidable engagement with said inclined cam, and a fluid-controlling valve element positioned relative to the body by the operator and controlling operation of the head.

3. A fluid-operated handpiece including, an elongated body, a fluid-operated head at the forward end of the body, an operator on the exterior of the body, a wall closing one end thereof and overlying the rear end of the body, a lever pivoted on the body to actuate the operator reciprocally, and valve means associated with the wall and operable by the operator and comprising relatively shiftable elongated, cylindrical telescopically engaged fluid-conducting tubes slidably co-engageable with each other, the innermost tube having a ported end and there being a valve seat within the outermost tube arranged to cooperatively engage the ported end of the innermost tube to close said valve means, one of said tubes being positioned by the operator thereby controlling the operation of the head.

4. A fluid-operated handpiece including, an elongated body, a fluid-operated head at the forward end of the body, an operator on the exterior of the body, a wall closing one end thereof and overlying the rear end of the body, a lever pivoted on the body to actuate the operator reciprocally, and valve means associated with the wall and operable by the operator and comprising a pair of relatively shiftable slidably telescopically-engaged fluid-conducting tubes, there being a valve seat entirely within the outermost tube, the innermost tube having an end smaller in diameter than the inner diameter of the outermost tube and engageable with the said seat to close said valve means, and said innermost tube having a passage extending entirely therethrough from said end to transmit fluid through the interior of the innermost tube, one of said tubes being engaged by said operator to control the operation of the head of the handpiece.

5. A fluid-operated handpiece including, an elongated body, a fluid-operated head at the forward end of the body, an operator sleeve reciprocally carried on the exterior of the body and having a wall closing one end thereof overlying the rear of the body, a lever pivoted on the body to actuate the operator reciprocally, and valve means arranged to be operated by movement of the wall of the operator and comprising a tube carried by the said wall and slidably telescopically engaged within a tube carried by the body stationarily relative to the handpiece, there being a valve seat entirely within the outermost tube to cooperatively engage the inner end of the innermost tube to close the valve and thereby control operation of the head.

6. A fluid-operated handpiece including, an elongated body, a fluid-operated head at the forward end of the body, an operator sleeve reciprocally carried on the exterior of the body and having a wall closing one end thereof overlying the rear end of the body, an opening in said wall, a lever pivoted on the body to actuate the operator reciprocally, and a valve to be operated by movement of the wall of the operator and comprising a pair of telescopically engaged fluid-conducting tubes, one tube carried by the wall and the other tube carried by the body, there being a seat in the outermost tube, said seat having a face smaller in diameter than the tube and arranged to be cooperatively engaged by the inner end of the innermost tube and said seat having a passage extending from said face to the interior of the outermost tube for discharge of fluid therethrough to control the operation of the head.

7. A fluid-operated handpiece including, an elongated body, a fluid-operated head at the forward end of the body, an operator sleeve reciprocally carried on the exterior of the body and having a wall closing one end thereof overlying the rear end of the body, an opening in said wall, a lever pivoted on the body to actuate the operator reciprocally, and a plurality of valves to be operated by movement of the wall of the operator and each valve comprising a pair of telescopically engaged fluid-conducting tubes, one tube carried by the wall and the other tube carried by the body, there being a seat in the outermost tube, said seat having a face to cooperatively engage the inner end of the innermost tube and control operation of the head.

8. A fluid-operated handpiece including, an elongated body, a fluid-operated head at the forward end of the body, an operator sleeve reciprocally carried on the exterior of the body and having a wall closing one end thereof overlying the rear end of the body, an opening in said wall, a lever pivoted on the body to actuate the operator reciprocally, and a plurality of valves to be operated by movement of the wall of the operator and each valve comprising a pair of telescopically engaged fluid-conducting tubes, one tube carried by the wall and the other tube carried by the body, there being a seat in the outermost tube, said seat having a face smaller in diameter than the tube to cooperatively engage the end of the innermost tube and a passage from the outside diameter of said face to the interior of the tube behind said face and controlling operation of the head.

9. A fluid-operated handpiece including, an elongated body, a fluid-operated head at the forward end of the body, an operator sleeve reciprocally carried on the exterior of the body and having a wall closing one end thereof and overlying the rear end of the body, a circular cam surrounding and fixed to said body intermediate the ends thereof, a collar surrounding said body and extending longitudinally between said cam and one end of said operator sleeve operable when depressed toward said body to actuate the operator reciprocally upon said body, and valve means arranged to be operated by movement of the end wall of the operator and comprising fluid-conducting telescopically engaged tubes slidable one within the other and housed within the body, one of said tubes being connected to the wall of the operator and communicating with a fluid supply tube having a ported inner end and the other tube having a valve seat enclosed therein and engageable by said ported end of said one tube to close said valve means, said one tube being positioned by the operator and thereby controlling the operation of the head.

10. The handpiece recited in claim 9, wherein the interior of the body surrounding said tubes is in communication with the exhaust of the head to conduct fluid therefrom.

References Cited in the file of this patent
UNITED STATES PATENTS

| | | |
|---|---|---|
| Re. 24,391 | McFadden | Nov. 12, 1957 |
| 2,281,142 | Davis | Apr. 28, 1942 |
| 2,664,632 | Norlen | Jan. 5, 1954 |
| 2,758,873 | Leisenring | Aug. 14, 1956 |
| 2,928,174 | White | Mar. 15, 1960 |